(12) United States Patent
Morrison

(10) Patent No.: US 11,318,709 B1
(45) Date of Patent: May 3, 2022

(54) MAT FOR PROVIDING EASE OF MOVEMENT FOR COUNTERTOP APPLIANCES ON SMOOTH SURFACES

(71) Applicant: I.M.C.G., Inc., Ft. Lauderdale, FL (US)

(72) Inventor: Michelle Marie Morrison, Lorain, OH (US)

(73) Assignee: I.M.C.G., INC., Lakewood Ranch, FL (US)

( * ) Notice: Subject to any disclaimer, the term of this patent is extended or adjusted under 35 U.S.C. 154(b) by 166 days.

(21) Appl. No.: 16/701,342

(22) Filed: Dec. 3, 2019

Related U.S. Application Data

(60) Provisional application No. 62/917,311, filed on Dec. 3, 2018, provisional application No. 62/919,397, filed on Mar. 12, 2019.

(51) Int. Cl.
| | |
|---|---|
| *B32B 25/10* | (2006.01) |
| *B32B 5/24* | (2006.01) |
| *B32B 5/02* | (2006.01) |
| *B32B 3/30* | (2006.01) |
| *A47G 29/00* | (2006.01) |
| *A47J 47/00* | (2006.01) |

(52) U.S. Cl.
CPC ............. *B32B 5/245* (2013.01); *A47G 29/00* (2013.01); *B32B 3/30* (2013.01); *B32B 5/024* (2013.01); *B32B 25/10* (2013.01); *A47J 47/00* (2013.01); *B32B 2262/0276* (2013.01); *B32B 2307/746* (2013.01); *B32B 2319/00* (2013.01)

(58) Field of Classification Search
CPC .......... B32B 7/02; B32B 27/12; A47G 27/02; A47G 27/0231
See application file for complete search history.

(56) References Cited

U.S. PATENT DOCUMENTS 9,254,624 B2   2/2016  Calkins
2016/0255977 A1*  9/2016  Burkhalter .............. B32B 15/14

* cited by examiner

*Primary Examiner* — Lawrence D Ferguson
(74) *Attorney, Agent, or Firm* — Brian S. Steinberger; Hilary F. Steinberger; Law Offices of Brian S. Steinberger, P.A.

(57) ABSTRACT

Mats, pads, devices and methods for providing a multilayer mat/pad or single layer mat/pad having an upper surface for supporting items, such as countertop appliances to remain in a stationary position relative to the mat, and a lower surface on the mat for allowing the mat with supported item to have ease of movement to easily slide across the countertop.

18 Claims, 5 Drawing Sheets

FIG. 4A
FIG. 4B
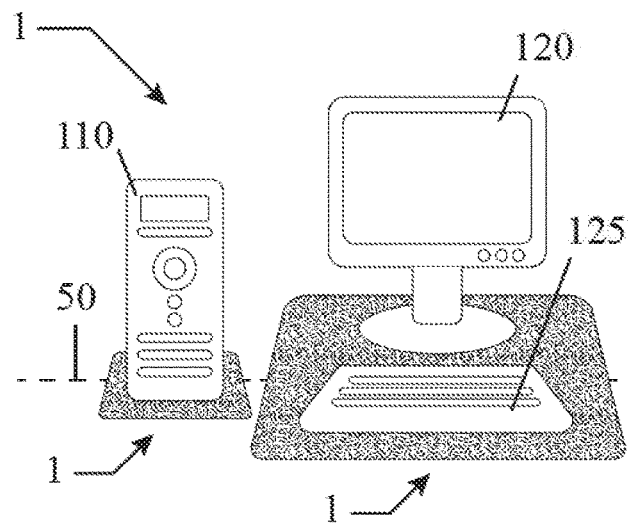
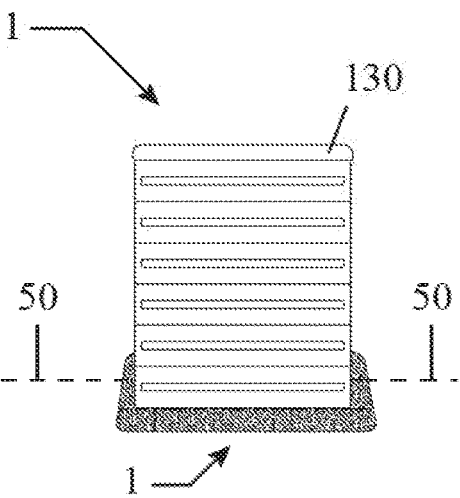
FIG. 4C
FIG. 4D
FIG. 4E
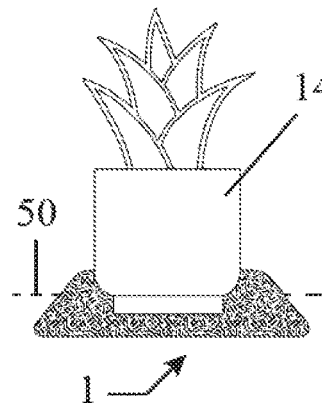
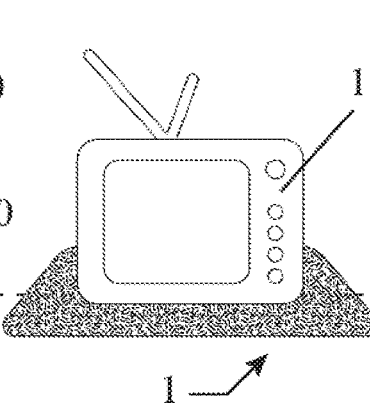
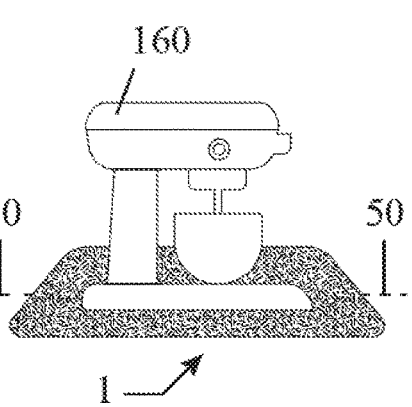
FIG. 4F
FIG. 4G
FIG. 4H
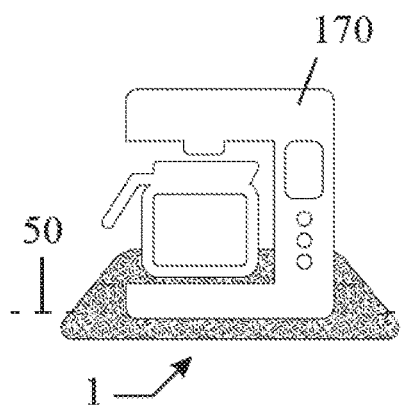
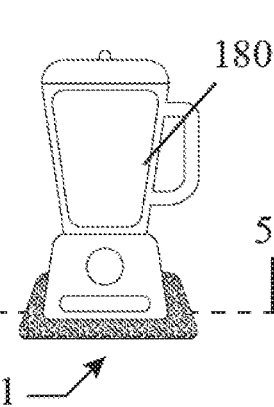
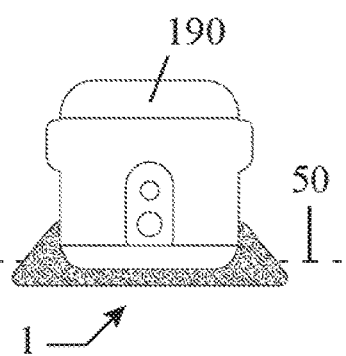

MAT FOR PROVIDING EASE OF MOVEMENT FOR COUNTERTOP APPLIANCES ON SMOOTH SURFACES

CROSS REFERENCE TO RELATED APPLICATIONS

This application claims the benefit of priority to U.S. Provisional Application Ser. No. 62/917,311 filed Dec. 3, 2018 and U.S. Provisional Patent Application Ser. No. 62/919,397 filed Mar. 12, 2019. The entire disclosure of each of the applications listed in this paragraph are incorporated herein by specific reference thereto.

FIELD OF INVENTION

This invention relates to countertop mats, and in particular to mats, pads, devices and methods for providing a multilayer mat/pad or single layer mat/pad having an upper surface for supporting items, such as countertop appliances to remain in a stationary position relative to the mat, and a lower surface on the mat for allowing the mat with supported item to have ease of movement to easily slide across the countertop.

BACKGROUND AND PRIOR ART

Currently, there are solutions for the movement of items on smooth surfaces. Some of these solutions attempt to move items such as, but not limited to, countertop appliances, but the solutions fail to meet the needs of the industry because it only allows movement of a few inches, forward and back and requires a "brake" to keep it from rolling forward on its own. Other solutions attempt to provide movement of countertop appliances across a surface, but these solutions are similarly unable to meet the needs of the industry because the wheels break and can mar countertops. Still, other solutions use a retractable drawer to store the countertop appliances in cabinets when not in use, but these solutions also fail to meet industry needs because it requires that the structure of the cabinet be altered.

The problem of moving appliances becomes compounded when the undersurface of the appliance is rough and pushing the appliance could markup the countertop and/or damage the underside of the appliance.

Thus, it would be desirable to have a free moving mat which protects surfaces from the underside of countertop appliances, items with rough undersides, and weighty materials. Furthermore, it would also be desirable to have a pad which an item rests on that allows it to slide on the countertop effortlessly when desired. Still, further, it would be desirable to have a pad that can be washed if it becomes soiled. Therefore, there currently exists a need in the industry for a gliding mat.

Thus, the need exists for solutions to the above problems with the prior art.

SUMMARY OF THE INVENTION

A primary objective of the present invention is to provide mats. Pads, devices and methods for providing a multilayer mat/pad or single layer mat/pad having an upper surface for supporting items, such as countertop appliances to remain in a stationary position relative to the mat, and a lower surface on the mat for allowing the mat with supported item to have ease of movement to easily slide across the countertop.

A secondary objective of the present invention is to provide mats and methods for providing a multilayer mat/pad or single layer mat/pad that can support heavy appliance type objects of up to approximately 30 pounds or more on a countertop that allows for the objects to easily slide along the countertop without damaging both the underside of the appliance nor the surface of the countertop.

A preferred embodiment can allow for the mat/pad to be made from one or more various materials, such as but not limited to two layers that can include combinations of textile materials on a lower surface layer of interwoven natural or synthetic fibers, plastic, synthetic material, and a top layer of compressible plastic foam, rubber, and the like.

The top layer can include a textured upper surface pattern that allows for better gripping with the undersurface of an appliance and the like.

The novel mat/pad allows for a limitless direction of movement as it glides across surfaces, increased safety and efficiency and is washable.

The novel mat/pad is unique because it provides ease of movement of items.

The novel mat/pad can be made from various textiles. The components are related to, but not limited to, interwoven natural or synthetic fibers, foams and/or rubber.

The device may also have one or more of the following: various shapes, patterns, colors, configuration, material body.

The invention allows for a limitless direction of movement as it glides across surfaces, increases safety and efficiency and is machine washable.

The top layer provides a cushioned layer for the underside of the appliance, and assists in providing ease of movement of countertop appliances.

Disclosed is a pad which is made up of one or more various materials. The components are related to, but not limited to, interwoven natural or synthetic fibers, plastic, synthetic material that can be molded when soft and formed into a solid shape, foams, and/or rubber.

The device may also be one or more of the following: various shapes, patterns, configuration, material body.

The disclosed device is unique when compared with other known devices and solutions because it provides: a limitless direction of movement as it glides across surfaces, increased safety and efficiency and is washable.

The novel mat/pad is also stretchable.

The disclosed device is unique in that it is structurally different from other known devices or solutions. More specifically, the device is unique because it provides ease of movement of items.

Among other things, it is an object of the present invention to provide a benefit that does not suffer from any of the problems or deficiencies associated with previous solutions.

The novel mats/pads eliminate dragging and lifting of appliances on countertops

The novel mats/pads can be trimmed with scissors to customize size and shape for specific applications.

The novel mats/pads protect countertops from scratches and scuffs.

The novel mats/pads have a low profile.

The novel mats/pads can easily allow users to move countertop appliances in any direction on the countertop.

The novel mats/pads are machine washable.

A preferred embodiment of a mat for supporting and sliding weighted objects on countertops, can include or consist of a generally planar sheet with dimensions of at least 8" long by at least 8" wide up to approximately ⅛" thick, the planar sheet having a top compressible and pliable surface to allow a weighted object to indent into the top compressible surface, and the planar sheet having a bottom slidable surface which allows the mat to slide on a flat hard surface.

The top compressible surface can include a top layer formed from at least one of: pliable low density rubber, rubber composite material, plastic open cell foam, rubber open cell foam. The top compressible surface can further include an upper facing surface having a raised textured pattern to enhance gripping action with the weighted object.

The top layer can include a thickness of approximately 1/14" (0.0714)" to approximately 1/10" (0.1").

The bottom slidable surface can include a bottom fabric material layer. The bottom fabric material layer can be formed from at least one of polyester fabric, interwoven natural fibers, and interwoven synthetic natural fibers.

The bottom fabric material layer can include a thickness of approximately 1/200" (0.005") to approximately 1/32" (0.3125".

The planar sheet can be approximately 8" long by approximately 8" wide. The planar sheet can be approximately 10" long by approximately 12" wide. The planar sheet can be approximately 12" long by approximately 14" wide.

A kit for providing mats for allowing countertop appliances to easily move in any direction on countertops, can include and/or consist of a first mat having an upper compressible and pliable surface and a lower facing slideable surface, the first mat being approximately 8" long by approximately 8" wide, a second mat having an upper compressible and pliable surface and a lower facing slideable surface, the first mat being approximately 10" long by approximately 12" wide, and a third mat having an upper compressible and compliable surface to allow a weighted object to indent into the top compressible surface and a lower facing slideable surface, the first mat being approximately 12" long by approximately 14" wide, wherein the mats are useful for allowing countertop appliances to easily move in any direction on countertops.

Each of the first mat, the second mat and third mat can include the upper compressible and pliable surface formed from at least one of: pliable low density rubber, rubber composite material, plastic open cell foam, rubber open cell foam, and the lower facing slideable surface is formed from at least one of polyester fabric, interwoven natural fibers, and interwoven synthetic natural fibers.

The upper compressible and pliable surface further can include a raised textured pattern to enhance gripping action with the weighted object A method for sliding appliances on countertops, can include the steps of providing a mat with dimensions of at least 8" long by at least 8" wide up to approximately 1/8" thick, providing the mat with a top compressible and pliable surface, providing the mat with a bottom slidable surface, positioning an appliance on the top compressible and pliable surface wherein the appliance forms indentations into the top compressible and pliable surface, and sliding the mat with the appliance on a flat hard surface in any direction.

The method can further include the steps of forming the top compressible and pliable surface from at least one of: pliable low density rubber, rubber composite material, plastic open cell foam, and rubber open cell foam, and forming the bottom slidable surface from at least one of polyester fabric, interwoven natural fibers, and interwoven synthetic natural fibers.

The of providing the mat can include the step of providing the mat with dimensions of at least approximately 8" long by at least approximately 8" wide by no greater than approximately 1/8" thick.

The method can further include the step of cutting the mat to a selected size.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 3A is an enlarged view of a portion of the side view of FIG. 3.

FIG. 4A shows a computer tower and computer monitor and keyboard on the mat of the preceding Figures on a countertop.

FIG. 4B shows an organizer with drawers and/or shelves on the mat of the preceding Figures on a countertop.

FIG. 4C shows a large planter on the mat of the preceding Figures on a countertop.

FIG. 4D shows a television on the mat of the preceding Figures on a countertop.

FIG. 4E shows a blender on the mat of the preceding Figures on a countertop.

FIG. 4F shows a coffee maker on the mat of the preceding Figures on a countertop.

FIG. 4G shows a juicer on the mat of the preceding Figures on a countertop.

FIG. 4H shows a multi-cooker on the mat of the preceding Figures on a countertop.

DESCRIPTION OF THE PREFERRED EMBODIMENTS

Figure 1:
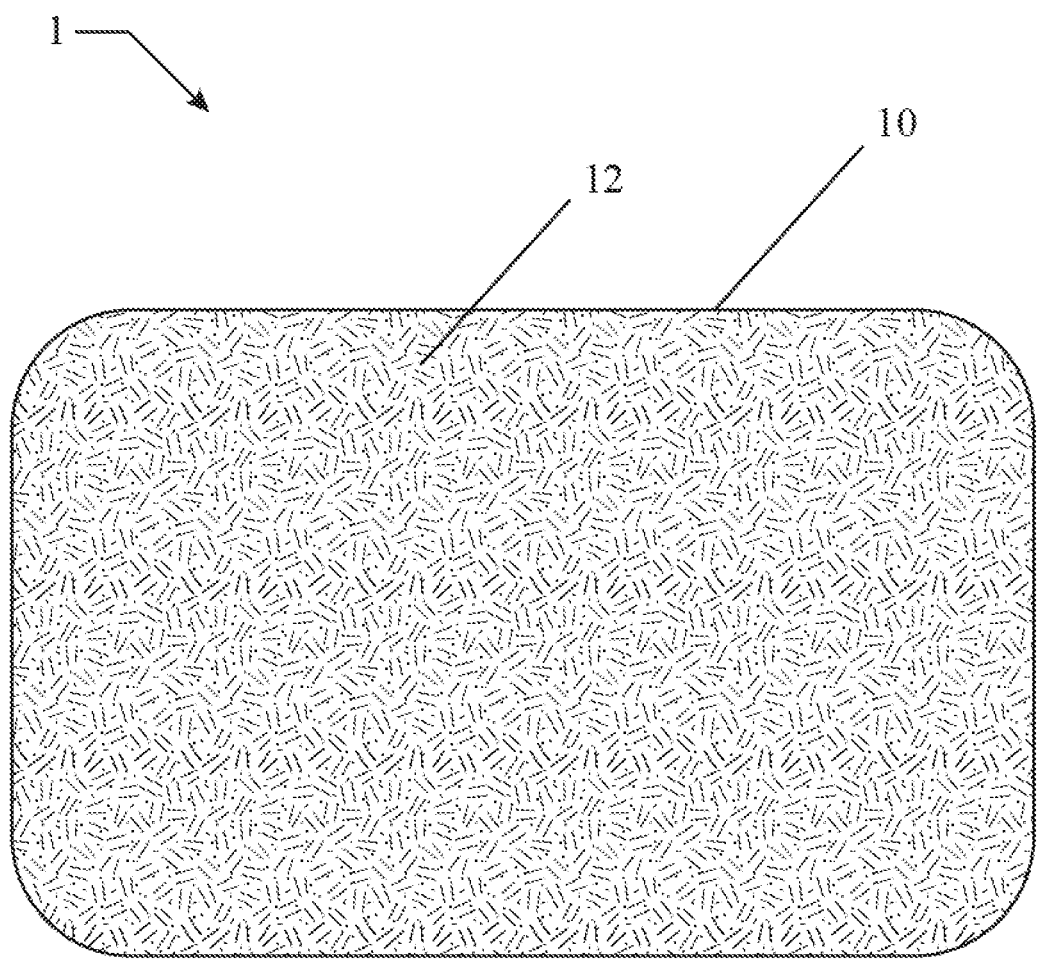
FIG. 1 is top view of a first embodiment of the novel mat having two layers.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.

1 first embodiment mat/pad
10 top layer
50 countertop
12 upper facing surface on top layer-textured pattern, such as slanted (angled) parallel rows of raised curves to enhance gripping action with the bottom of an appliance.
20 bottom layer
110 computer tower
120 monitor
125 keyboard
130 organizer with drawers and/or shelves
140 planter
150 television
160 mixer/blender
170 coffee maker
180 juicer
190 multi-cooker
200 second embodiment single layer mat/pad In its most complete version, the novel mat, pad and device can be formed from the following components: various textiles consisting of layers of fabric and rubberlike material for the purpose of sliding countertop appliances on smooth surfaces. These components are related as follows: interwoven material of various colors, patterns, shapes, forms, configurations consisting of layers which form a pad. It should be further noted that the formulation does not interfere with the function of the pad.

First Embodiment

Figure 2:
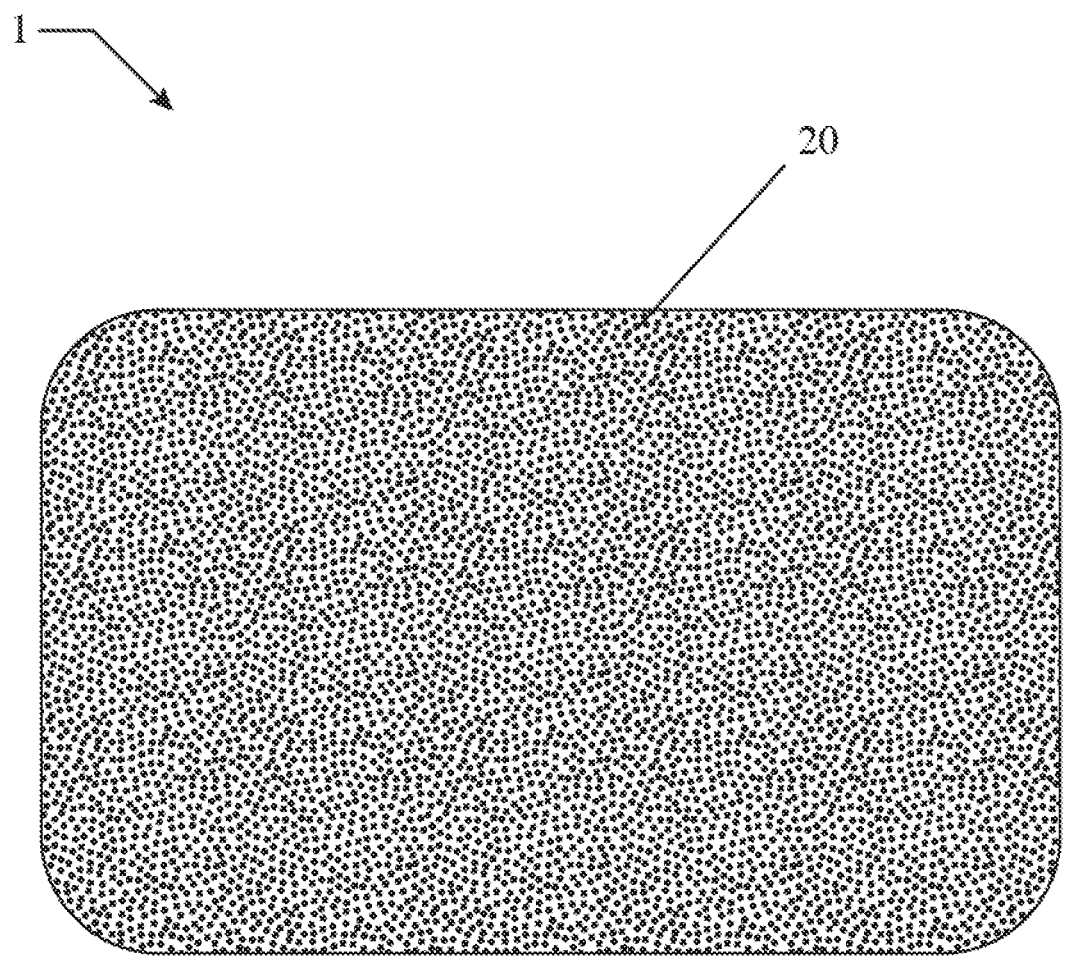
FIG. 2 is a bottom view of the mat of FIG. 1.
Figure 3:
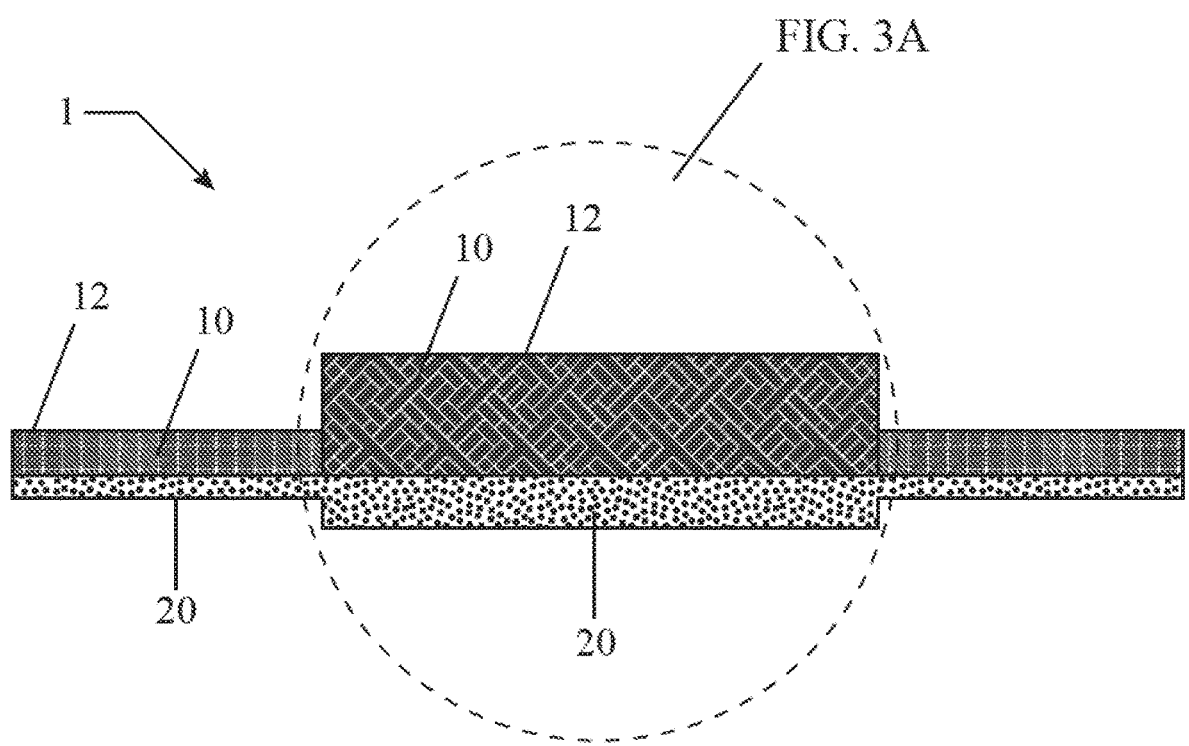
FIG. 3 is a side view of the mat of FIG. 1.

FIG. 1 is top view of a first embodiment of the novel mat 1 having two layers which includes a top layer 10 with upper facing surface 12. FIG. 2 is a bottom view of the mat 1 of FIG. 1 showing the bottom layer 20. FIG. 3 is a side view of the mat 1 of FIG. 1. FIG. 3A is an enlarged view of a portion of the side view of mat 1 of FIG. 3.

Referring to FIGS. 1-3A, the mat/pad 1 can include a top layer 10 that is a top cushioning layer 10 adhered by glue and the like to a bottom layer 20 having a slidable lower facing surface.

The top layer 10 can be formed from a pliable low-density rubber, rubber composite, such as but not limited to butadiene rubber, and/or a plastic open cell foam material, open cell sponge rubber. The upper facing surface 12 on the top layer 10 can have a textured pattern, such as slanted (angled) parallel rows of raised curves to enhance gripping action with the bottom of the appliance.

The bottom layer 20 can be formed from a fabric or textile material, such as a polyester fabric, and/or interwoven natural (such as cotton and the like) and/or synthetic fibers (such as nylon, and the like).

A preferred color of the top layer 10 can be a solid color, such as black. Alternatively, various colors, such as but not limited to red, orange, yellow, green, blue and combinations thereof can be used.

A preferred color of the bottom layer 20 can be a different color, such as but not limited to red, orange, yellow, green, blue and the like. Lower facing surface can be screen printed with advertising indicia and the like.

In one preferred embodiment of the mat 1, the top layer 10 can be black and the bottom layer 20 can be orange.

The novel mat/pad 1 can have an overall thickness of approximately 1/12" to approximately 1/8" inch thick The top layer 10 can have a thickness of between approximately 1/14" (0.0714)" to approximately 1/10" (0.1"). The bottom layer 20 can have a thickness of between approximately 1/200" (0.005") to 1/32" (0.3125".

Table 1 shows the range of thickness for the top layer 10, the bottom layer 20 and the combined layers in the mat/pad 1.

TABLE 1

|  | Broad range | Preferred |
|---|---|---|
| Top Layer thickness | 1/14" (0.0714)" to 1/10" (0.1") | 99/100" (.099") |
| Bottom Layer thickness | 1/200" (0.005") to 1/32" (0.3125" | 1/100 (.01') |
| Both layers overall thickness | 1/12" (0.083" to 1/8" (0.125") | 1/10" (0.1") |

The novel mat 1 allows for various appliances, such as but not limited to a stand mixer, coffee maker, blender, toaster oven, air fryer, crock pot, food processor, toaster, television, computer monitor, large planter, slow cooker, juicer, panini press, pressure cooker, soda machine. The mat 1 allows for the appliance to easily slide on flat and hard kitchen countertops 50, such as but not limited to granite surfaces, quartz, quartzite, marble, Formica, butcher block, tile, and hard epoxy surfaces FIG. 4A shows a computer tower 110, computer monitor 120 and keyboard 125 each positioned on the mat 1 of the preceding Figures on a countertop 50.

FIG. 4B shows an organizer with drawers and/or shelves 130 positioned on the mat 1 of the preceding Figures on a countertop 50.

FIG. 4C shows a large planter 140 positioned on the mat 1 of the preceding Figures on a countertop 50.

FIG. 4D shows a television 150 positioned on the mat 1 of the preceding Figures on a countertop 50.

FIG. 4E shows a mixer/blender 260 positioned on the mat 2 of the preceding Figures on a countertop 50.

FIG. 4F shows a coffee maker 170 positioned on the mat 1 of the preceding Figures on a countertop 50.

FIG. 4G shows a juicer 180 positioned on the mat 1 of the preceding Figures on a countertop 50.

FIG. 4H shows a multi-cooker 190 on the mat 1 of the preceding Figures positioned on a countertop 50.

Second Embodiment

Figure 5:
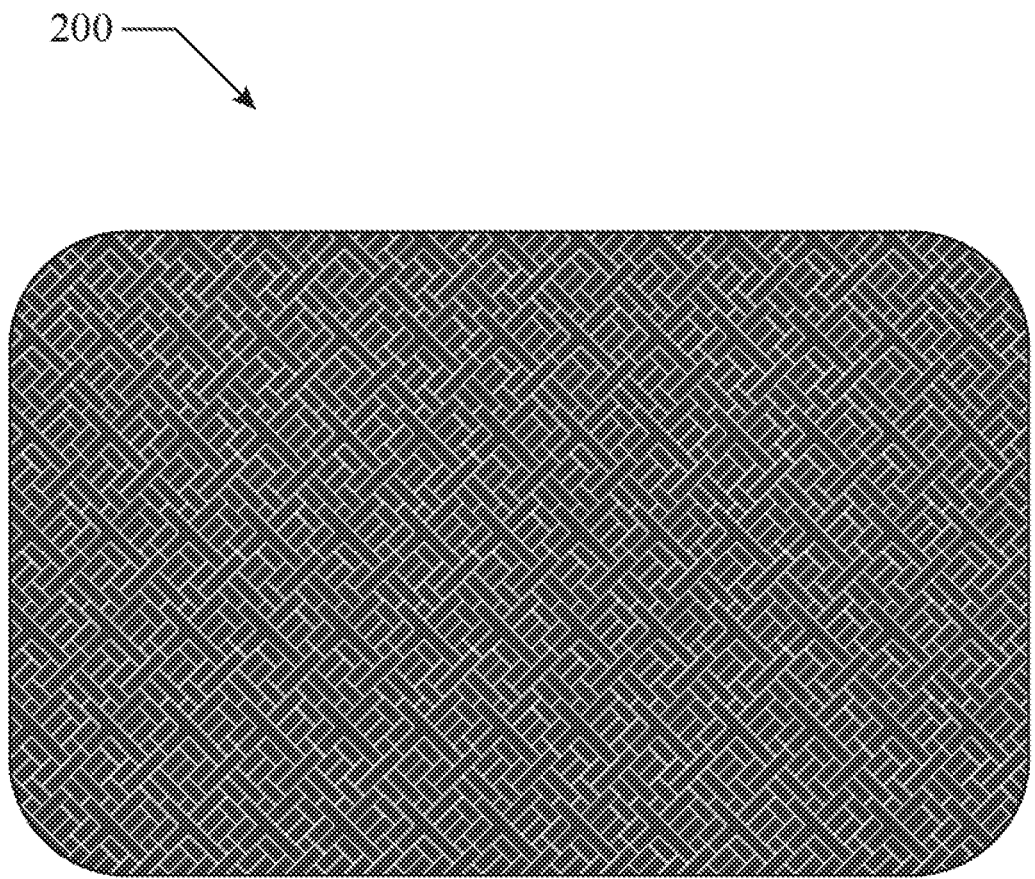
FIG. 5 is a top view of a second embodiment single layer mat.

FIG. 5 is a top view of a second embodiment single layer mat. 200. The single layer 200 version can be formed from one layer having overall thickness similar to overall thickness shown in Table 1. The single layer version can be a molded mat/pad.

The single layer material can be compressible so as to allow the weight of the appliance to push and depress into the upper surface, while having the bottom surface still being easily slidable over a countertop surface. The upper surface on the top of the mat 200 can also include a textured surface similar to the textured surface 12 referenced in the previous embodiment.

The novel mats/pads 1, 200 can be packaged in kit type formats having three different sizes, that can include a package of three sizes, such as an 8"×8" mat, a 10"×12" mat and a 12"×14" mat.

The user can also trim the mats/pads into selected sizes by cutting the mats/pads with scissors.

The term "approximately"/"approximate" can be +/−10% of the amount referenced. Additionally, preferred amounts and ranges can include the amounts and ranges referenced without the prefix of being approximately.

While the preferred embodiments shown in the drawings appear to have a rectangular configuration, the novel mats/pads can include other shapes and configurations, such as but not limited to triangular shape, and other geometric type shapes and the like.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A kit for providing mats for allowing countertop objects to easily move in any direction on countertops, comprising:
   a first mat having an upper compressible and pliable surface and a lower facing slideable surface, the first mat being approximately 8" long by approximately 8" wide;
   a second mat having an upper compressible and pliable surface and a lower facing slideable surface, the second mat being approximately 10" long by approximately 12" wide; and
   a third mat having an upper compressible and compliable surface to allow a weighted object to indent into the top compressible surface and a lower facing slideable surface, the third mat being approximately 12" long by approximately 14" wide, wherein the first mat, the second mat, and the third mat are useful for allowing countertop objects to easily move in any direction on countertops.

2. The kit of claim 1, wherein each of the first mat, the second mat and third mat includes:
   the upper compressible and pliable surface formed from at least one of: pliable low density rubber, rubber composite material, plastic open cell foam, rubber open cell foam; and the lower facing slideable surface is formed from at least one of polyester fabric, interwoven natural fibers, and interwoven synthetic natural fibers.

3. The kit of claim 2, wherein the upper compressible and pliable surface further includes:
   a raised textured pattern to enhance gripping action with the weighted object.

4. The kit of claim 3, wherein each of the first mat, the second mat, and the third mat include:
   an overall thickness between approximately 1/12 inch to approximately 1/8 inch.

5. The kit of claim 1, wherein the lower facing slideable surface of each of the first mat, the second mat, and the third mat include:
   a thickness between approximately 1/14 inch to approximately 1/10 inch.

6. The kit of claim 5, wherein the lower facing slideable surface of each of the first mat, the second mat, and the third mat include:
   a thickness between approximately 1/200 inch to approximately 1/32 inch.

7. A kit of mats for allowing countertop objects to easily move in any direction on countertops, comprising:
   a plurality of mats, each mat having an upper compressible and pliable surface and a lower facing slideable surface, each upper compressible and compliable surface to allow a weighted object to indent into the top compressible surface and each lower facing slideable surface, for allowing countertop objects to easily move in any direction on countertops, wherein the plurality of mats includes:
   a first mat being approximately 8" long by approximately 8" wide; and
   a second mat being approximately 10" long by approximately 12" wide.

8. The kit of claim 7, wherein each upper compressible and pliable surface is formed from at least one of: pliable low density rubber, rubber composite material, plastic open cell foam, rubber open cell foam.

9. The kit of claim 7, wherein each lower facing slideable surface is formed from at least one of polyester fabric, interwoven natural fibers, and interwoven synthetic natural fibers.

10. The kit of claim 7, wherein each upper compressible and pliable surface further includes:
    a raised textured pattern to enhance gripping action with the weighted object.

11. A kit of mats for allowing countertop objects to easily move in any direction on countertops, comprising:
    a plurality of mats, each mat having an upper compressible and pliable surface and a lower facing slideable surface, each upper compressible and compliable surface to allow a weighted object to indent into the top compressible surface and each lower facing slideable surface, for allowing countertop objects to easily move in any direction on countertops, wherein the plurality of mats includes:

a first mat being approximately 10" long by approximately 12" wide; and a second mat being approximately 12" long by approximately 14" wide.

12. A kit of mats for allowing countertop objects to easily move in any direction on countertops, comprising:

a plurality of different size mats, each mat having an upper compressible and pliable surface and a lower facing slideable surface, each upper compressible and compliable surface to allow a weighted object to indent into the top compressible surface and each lower facing slideable surface, for allowing countertop objects to easily move in any direction on countertops, wherein the at least two different size mats includes:

each of the plurality of mats having dimensions of at least approximately 10 inches long by at least approximately 12 inches wide.

13. The kit of claim 11, wherein each upper compressible and pliable surface is formed from at least one of: pliable low density rubber, rubber composite material, plastic open cell foam, rubber open cell foam.

14. The kit of claim 11, wherein each lower facing slideable surface is formed from at least one of polyester fabric, interwoven natural fibers, and interwoven synthetic natural fibers.

15. The kit of claim 11, wherein each upper compressible and pliable surface further includes:

a raised textured pattern to enhance gripping action with the weighted object.

16. The kit of claim 12, wherein each upper compressible and pliable surface is formed from at least one of: pliable low density rubber, rubber composite material, plastic open cell foam, rubber open cell foam.

17. The kit of claim 12, wherein each lower facing slideable surface is formed from at least one of polyester fabric, interwoven natural fibers, and interwoven synthetic natural fibers.

18. The kit of claim 12, wherein each upper compressible and pliable surface further includes:

a raised textured pattern to enhance gripping action with the weighted object.

* * * * *